United States Patent [19]

Shrikhande

[11] Patent Number: 4,834,998

[45] Date of Patent: May 30, 1989

[54] ULTRAFILTRATION OF RED WINES

[75] Inventor: Anil J. Shrikhande, Farmington, Conn.

[73] Assignee: Heublein, Inc., Farmington, Conn.

[21] Appl. No.: 944,094

[22] Filed: Dec. 22, 1986

[51] Int. Cl.$^4$ .............................................. C12H 1/02
[52] U.S. Cl. ................. 426/330.4; 426/422; 426/592
[58] Field of Search ............... 426/330.4, 592, 271, 426/422, 424, 425; 210/650, 651, 654

[56] References Cited

U.S. PATENT DOCUMENTS

| | | | |
|---|---|---|---|
| 2,258,216 | 10/1941 | Ramage | 99/48 |
| 2,860,987 | 11/1958 | Werner | 99/48 |
| 4,073,954 | 2/1978 | Mobius | 426/271 |
| 4,227,999 | 10/1980 | Ebner | 210/650 |
| 4,320,009 | 3/1982 | Hilton et al. | 426/271 |
| 4,490,399 | 12/1984 | Weetall | 426/330 |
| 4,499,117 | 2/1985 | Bonneau | 426/592 |
| 4,532,140 | 7/1985 | Bonnome | 426/13 |
| 4,581,236 | 4/1986 | Bandel et al. | 426/14 |
| 4,617,127 | 10/1986 | Light | 426/592 |
| 4,724,080 | 2/1988 | Daun | 210/651 |

OTHER PUBLICATIONS

Serrano et al. CA 101 (17): 149718b.
Shpritsman et al., Vinogradarstvo I Vinodelie Moldavii, 1979 34 (11) 31–34.
Federal Register, vol. 49, No. 288, Sep. 24, 1984.
Letter from Vic-Key Consultants, Mar. 14, 1986.
Letter from Papagni Vineyards, Feb. 1, 1984.
Letter from Sutter Home Winery, Inc., Jan. 17, 1985.
Letter from J. Lohr Winery, Jan. 10, 1985.
Letter from Canadaigua Wine Company, Jan. 22, 1985.
Letter from Heublein Wines, Jan. 22, 1985.
Letter from Montevina Wines, Jan. 23, 1985.
Letter from Mirassou Sales Company, Jan. 30, 1985.
Letter from Millipore Products Division, Jan. 17, 1985.
Letter from the Taylor Wine Company, Inc. 1/22/85, 5/2/84.
Letter from Paul Masson Vineyards, Jan. 22, 1985.
Ultrafiltration from *Practical Winery*, vol. V, No. 4 Nov./Dec. 1984.
Protein Stabilization of Sauvignon Blanc by Ultrafiltration, by Gnekow et al., Presented at the 34th Annual Meeting American Society of Enologists, Reno, Nevada, Jun. 22, 1983.
CA97:143096Z The Control of Browning of White Table Wine by Ultrafiltration by Amano et al., Yamanashi Daigaku Hakko Kenkyusko Kenkyu Hokoku, 1980, 15, 15–22 (Japan).

*Primary Examiner*—Donald E. Czaja
*Assistant Examiner*—Carolyn Paden
*Attorney, Agent, or Firm*—McCormick, Paulding & Huber

[57] ABSTRACT

Red wines, particularly pressed red wines, contain harsh impurities such as tannins. The instant process removes harsh tannins and other impurites from red wines through the use of ultrafiltration techniques using selective membranes which reduce the amounts of harsh tannins without appreciably affecting the desirable components of the wines such as the red color.

3 Claims, No Drawings

ULTRAFILTRATION OF RED WINES

BACKGROUND OF THE INVENTION

Pressed wines are an integral part of grape processing and vary in quality and quantity depending upon the handling and pressing practices. In white wine processing, the free run juice is separated from press juice and is fermented separately. Press wines are generally inferior to free run juice because of the extraction of harsh tannins from skins and seeds. In red wine processing, the crushed grapes with skins and seeds are fermented and the free run wine is separated and the residue is pressed to recover additional wine. This press wine becomes excessively harsh and is normally diverted to a distilling material which is eventually recovered as grape spirits. However, this diversion results in economic loss since a by-product of lower value is recovered in place of red wine.

It is a common knowledge that harshness of wines results from extraction of large molecular weight tannins associated with skins and seeds of grapes. These tannins are referred to as condensed tannins in general and procyanidins polymers in particular. These large tannin molecules impart significant astringency and bitterness to the wines.

Many classical approaches are available to reduce harsh tannins from wines but in general they are non-specific and create a side effect in treatment of wines. Gelatin or egg white fining of wines which is traditionally applied to reduce harsh tannins, is only suitable for marginal harshness while their use necessitates their removal from wines by other treatments. Anion exchange resins can be applied to reduce the harsh tannins, but the treatment is non-specific and results in extensive loss of fruitiness of wines and removes a part of wine acid which must be replenished. It would be extremely beneficial to reduce the tannin content of pressed wines to produce a palatable wine product which retain its desirable characteristics including its red color.

SUMMARY OF THE INVENTION

The present invention relates to a novel process for removing tannins from red wines, especially pressed wines, through the use of an ultrafiltration technique which employs an ultrafiltration membrane of particular type and particular pore size. This technique selectively reduces the amounts of harsh tannins without appreciably affecting the desirable components of red wines such as color and taste characteristics.

DETAILED DESCRIPTION OF THE INVENTION

It has been discovered that polymeric membranes of particular type and particular pore size can selectively remove harsh tannins from red press wines without affecting the desirable color and taste characteristics and composition of wines. In red press wines, harsh tannins are the largest molecular weight compounds in clarified wines which produce undesirable astringency and bitterness. These harsh tannins are separated from other desirable small molecules such as alcohol, sugar, acid, aroma compounds and other small phenolics including anthocyanins, the red pigments of wines, by ultrafiltration techniques which will be discussed herein.

It has been surprisingly discovered that cellulosic membranes with a nominal molecular weight cut-off of ranging from 5,000 to 20,000 daltons, preferably 5,000 to 10,000 daltons, are unexpectedly superior to other commercially available membranes, such as polysulfone, polysulfone ether and polyvinylidene fluoride type membranes for the removal of harsh tannins from red wine. The use of the cellulosic membranes permits the maximum retention of red color and fruitiness in the ultrafiltered wine product. Commercially available cellulosic membranes which can be utilized in the instant invention include Amicon designation YM10 and Dorr-Olive designation C-10.

Few if any substances or molecules in wines or juices which are larger than 10,000 to 20,000 daltons are desirable constituents thereof. The substances which are removed by ultrafilters with NMWL values greater than or equal to 20,000 daltons include microorganisms and colloidal impurities. These latter impurities include hazes, carbohydrate-protein and protein-tannin (phenolic) complexes and individual protein, tannin, and carbohydrate molecules with sizes greater than or equal to a nominal value of 20,000 daltons. Several of these substances are currently removed by either centrifugation, pad, sheet, pressure-leaf, other diatomaceous earth filtration, and sterilizing filtration with tight pads or membranes, or combinations of these methods. In current practice, individual dissolved molecules of proteins and tannins (phenolics) are removed partially by chemical fining agents such as bentonite, gelatin, tannic acid, and activated carbon.

The following is a general overview of ultrafiltration technique.

Ultrafiltration (UF) is a pressure-driven liquid filtration process which performs a physical separation of substances larger than the nominal pore size of the filtration medium. Substances which are smaller than the filter's pores will pass through. Substances which are larger will be rejected and held on the upstream side of the filtration medium. In this regard, ultrafiltration is similar to pad, sheet, diatomaceous earth, and sterilizing filtration processes employed world wide in the wine industry. Ultrafiltration differs from the aforementioned filtration processes only by the scale of the separation it performs. An ultrafilter has pores which are small enough to prevent certain large molecules from passing through. Thus, ultrafiltration is a physical separation process which performs its separation down at the molecular level.

The method by which ultrafilters are ranked for the approximate size of molecules they will retain or pass is described as follows. The size of the pores of an ultrafilter can be approximated by stating a nominal molecular weight limit (NMWL). The unit employed for this purpose is the dalton which is defined as the mass of one hydrogen atom, or $1.67 \times 10^{-24}$ grams.

An ultrafiltration system is usually employed by providing two fluid connections to a storage or feed tank and a third fluid connection to a filtrate collection tank. Feed is pumped from the storage tank through the filtration device. The unfiltered feed is returned to the tank. The filtrate is directed to the collection tank. It is not uncommon to process an entire tank or lot of wine in this fashion. However, the process may be interrupted at any time for repairs, cleaning or change of filters, or simply shut down.

The ultrafiltration filters are not disposable elements of the system. They may be cleaned and reused by procedures which employ only common winery chemicals (for example NaOCL, NaOH, other chlorine-containing compounds and citric acid) and detergents. When not in use, the filters are stored in an aqueous bacteriostatic solution such as chlorine, metabisulfite, $SO_2$ or NaOH. Before the filters are again used on product, they are flushed with water and preconditioned with acidic solutions.

In accordance with the foregoing discussions both white and red harsh wines which were not palatable were subjected to ultrafiltration using membranes having pore sizes ranging from $10^{-3}$ to $10^{-2}$ microns. The wines were circulated over the ultrafiltration membrane and the permeate was continuously removed as a product. The retentate portion which progressively became more concentrated by the rejected species (harsh tannins) was ultimately discarded.

Upon treatment of red harsh wines, it was discovered that in general harsh tannins can be reduced by treatments by membranes with a nominal molecular weight cut-off ranging from 5,000 to including 20,000 daltons most preferably from 5,000 to 10,000 daltons. The use of cellulosic membranes with 10,000 daltons provided exceptional harshness reduction without appreciably affecting the desirable characteristics and composition of red wines.

Upon further testing in the ultrafiltration of red wines, it was found that membrane polymer rather than porosity (nominal molecular weight cut-off) had a great influence on flux rates. Highest flux rates were obtained with cellulosic membranes as displayed in Example 4.

Furthermore, in the ultrafiltration of red press wines, it was found that the use of a 10,000 daltons cellulosic membrane reduced harsh tannins while allowing the maximum migration of red color and flavor (fruitiness). It is a surprising result that the instant ultrafiltration process does not remove the red color from red press wines but does remove the off-white colors from treated white wines.

These and other advantages of the instant invention will be displayed in the following examples which are meant to illustrate the invention but not to limit the scope thereof.

EXAMPLE 1

A 30 gallon of red press wine was simultaneously filtered through three different membranes; one membrane utilized was a cellulosic 10,000 daltons membrane, the second membrane was a polysulfone 10,000 daltons membrane, and the third membrane was another variant of a polysulfone 20,000 daltons membrane. Table 1 shows that the red wine ultrafiltered through the cellulosic 10,000 daltons membrane displayed a reduced harsh tannin content and a slightly reduced red pigment content. The red pigment which was removed were intimately associated with harsh tannins but the wine still retained sufficient red color for red wine designation. In contrast, red wine treated with polysulfone membranes lost both tannins and red color and was practically devoid of original wine flavor. The clear superiority of cellulosic 10,000 daltons membrane for hashness reduction of red press wines over polysulfone membranes with 10,000 and 20,000 daltons designation is demonstrated in Table 1.

TABLE 1

EFFECTS OF TYPE OF ULTRAFILTRATION MEMBRANES ON COLOR AND TANNIN REMOVAL FROM RED PRESS WINES

| TYPE OF MEMBRANES | COLOR | | | TAN-NIN | APPEAR-ANCE |
|---|---|---|---|---|---|
| | 520 NM | 420 NM | Intensity | | |
| Red Press (Control) | 1.29 | .797 | 2.09 | 3780 | Red Wine |
| Cellulosic, 10,000 MW, (Permeate) | 0.70 | 0.42 | 1.12 | 2357 | Red Wine |
| Polysulfone, 10,000 MW, (Permeate) | 0.277 | 0.175 | 0.452 | 1301 | Dark Rose |
| Polysulfone 20,000 MW, (Permeate) | 0.133 | 0.070 | 0.183 | 613 | Rose Wine |

EXAMPLE 2

A 100 gallons portion of distilling grade red press wines was ultrafiltered with cellulosic 10,000 daltons membrane to 99.5 gallons of permeate (product) and 0.5 gallons of retentate portion. The permeate portion was essentially devoid of harshness while retaining other characteristics of original wine. Table 2 displays the effects of the ultrafiltration comparing ultrafiltered red press wine and the retentate with a red press wine control. From Table 2 it is evident that the tannin content of original wine decreased from 3746 to 2851 in the ultrafiltered red press wine. It is apparent that the tannins are responsible for harshness. The color intensity in the ultrafiltered wine decreased from an original value of 1.96 to 1.429 which most probably accounts for those red pigments which are intimately associated with harsh tannins. These qualities together with practically little change in alcohol, acid, volatile acid and $SO_2$ reflect the specificity of the ultrafiltration membranes for harshness reduction from red wines. The ultrafiltered red press wine was improved in quality from non-blending wine to premium red wine blend.

TABLE 2

EFFECTS OF ULTRAFILTRATION WITH CELLULOSIC 10,000 DALTONS MOLECULAR CUT-OFF MEMBRANE ON TANNIN AND OTHER COMPOSITION OF RED PRESS WINE

| | TREATMENT | | |
|---|---|---|---|
| | Red Press (Control) | Ultrafiltered Red Press (Product) | Retentate, Rejected Portion of Wine |
| Tannin (ppm) | 3746 | 2851 | 26,966 |
| COLOR: | | | |
| Intensity | 1.96 | 1.429 | 1.306* |
| Hue | 1.57 | 1.58 | 1.59 |
| Alcohol % By Volume | 11.07 | 10.94 | 10.91 |
| Acidity gm/100 ml | .660 | .635 | 1.01 |
| $SO_2$ ppm | 76 | 54 | 64 |
| Taste | Very harsh, fruity | Not harsh, fruity | Excessively harsh |

*Retentate diluted 10:1 with pH 3.5 buffer for color measurement

EXAMPLE 3

In accordance with the procedures of Example 2 red press wine was ultrafiltered with cellulosic 5,000 dalton membrane to produce a permeate (product) and a retentate portion. The recovered permeate portion was essentially devoid of harshness but was red in color and retained its original wine character. The reduced tannin content and the color characteristics are displayed in Table 3.

TABLE 3
EFFECTS OF ULTRAFILTRATION WITH CELLULOSIC 5000 DALTONS MOLECULAR CUT-OFF MEMBRANE ON COLOR AND TANNIN REDUCTION FROM RED PRESS WINES

| TREATMENT | 520 nm | 420 nm | Intensity | Hue | Tannin (ppm) | Appearance and Taste |
|---|---|---|---|---|---|---|
| Red Press (Control) | 1.407 | 0.790 | 2.20 | 1.78 | 3902 | Red wine, very harsh |
| Ultrafiltered (Permeate) | 0.793 | 0.442 | 1.235 | 1.79 | 2204 | Red wine, not harsh |

EXAMPLE 4

Twenty gallons of red pressed wine was simultaneously ultrafiltered through three different types of membranes, namely a 10,000 dalton cellulosic membrane, a 10,000 dalton polysulfone membrane and a 20,000 dalton variant of a polysulfone membrane. The press wine was recycled on the membranes at an average temperature of 75° to 80° F. under five pounds pressure differential and the flux rate (permeate flow rate) was measured hourly for five hours for each type of membrane. The average flux rate was determined for each membrane, namely, 23.8 GFD for the 10,000 dalton cellulosic membrane, 16.05 GFD for the 10,000 dalton polysulfone and 3.4 GFD for the 20,000 dalton polysulfone. GFD refers to the throughput of permeate in gallons per day (24 hours) per square foot of membrane area.

I claim:

1. A process to remove harsh tannins from red wine comprising:
   providing a cellulosic ultrafiltration membrane having a nominal molecular weight cut-off ranging from 5,000 to 20,000 daltons; and
   subjecting the wine to an ultrafiltration processing step which utilizes the cellulosic membrane to selectively remove the harsh tannins, microorganisms and other colloidal impurities larger in size than the nominal molecular weight cut-off of the membrane, without significantly affecting the red color of the wine.

2. A process as defined in claim 1 wherein said wine is pressed red wine.

3. A process as defined in claim 1 wherein said cellulosic ultrafiltration membrane has a nominal molecular weight cut-off ranging from 5,000 to 10,000 daltons.

* * * * *